(12) United States Patent
Bunker et al.

(10) Patent No.: US 8,739,404 B2
(45) Date of Patent: Jun. 3, 2014

(54) TURBINE COMPONENTS WITH COOLING FEATURES AND METHODS OF MANUFACTURING THE SAME

(75) Inventors: Ronald Scott Bunker, Waterford, NY (US); Bin Wei, Mechanicville, NY (US); Ann Melinda Ritter, Mount Tremper, NY (US); Don Mark Lipkin, Niskayuna, NY (US); Raul Basilio Rebak, Schenectady, NY (US); Lawrence Bernard Kool, Clifton Park, NY (US); Dennis Michael Gray, Delanson, NY (US)

(73) Assignee: General Electric Company, Niskayuna, NY (US)

( * ) Notice: Subject to any disclaimer, the term of this patent is extended or adjusted under 35 U.S.C. 154(b) by 654 days.

(21) Appl. No.: 12/953,177

(22) Filed: Nov. 23, 2010

(65) Prior Publication Data

US 2012/0124832 A1 May 24, 2012

(51) Int. Cl.
*B21K 25/00* (2006.01)

(52) U.S. Cl.
USPC .................. 29/889.2; 29/889.721; 29/889.72

(58) Field of Classification Search
USPC ................ 29/889.7, 889.72, 889.721; 416/92
See application file for complete search history.

(56) References Cited

U.S. PATENT DOCUMENTS

| | | | |
|---|---|---|---|
| 2,641,439 A * | 6/1953 | Williams | 416/90 R |
| 3,656,863 A | 4/1972 | De Feo | |
| 3,698,834 A | 10/1972 | Meginnis | |
| 3,963,368 A | 6/1976 | Emmerson | |
| 4,040,159 A * | 8/1977 | Darrow et al. | 29/889.721 |
| 4,118,146 A | 10/1978 | Dierberger | |
| 4,311,433 A | 1/1982 | Bratton et al. | |
| 4,314,794 A | 2/1982 | Holden et al. | |
| 4,527,386 A | 7/1985 | Markowski | |
| 4,583,914 A | 4/1986 | Craig et al. | |
| 4,629,397 A | 12/1986 | Schweitzer | |
| 4,896,510 A | 1/1990 | Foltz | |
| 5,249,357 A * | 10/1993 | Holmes et al. | 29/890.01 |
| 5,381,652 A | 1/1995 | Mezzedimi et al. | |
| 5,383,766 A | 1/1995 | Przirembel et al. | |
| 5,626,462 A | 5/1997 | Jackson et al. | |

(Continued)

FOREIGN PATENT DOCUMENTS

| | | |
|---|---|---|
| GB | 2355017 | 4/2001 |
| JP | 2108822 | 4/1990 |

(Continued)

OTHER PUBLICATIONS

Dobbs, James R., et al.; "Advanced Airfoil Fabrication", Superalloys, vol. 96, No. 61, 1996, pp. 523-529.

(Continued)

*Primary Examiner* — David Bryant
*Assistant Examiner* — Ruth G Hidalgo-Hernandez
(74) *Attorney, Agent, or Firm* — Ann M. Agosti

(57) ABSTRACT

The present disclosure is directed to the use and manufacture of cooling features within a component used in a hot gas path, such as within a turbine. In one embodiment, channels are formed within an external surface of the component and filled with a removable material. The external surface and channels may then be coated with one or more layers, such as a structural layer and/or top coat. The removable material may then be removed to leave the channels free of the removable material.

22 Claims, 5 Drawing Sheets

(56) References Cited

U.S. PATENT DOCUMENTS

| | | | |
|---|---|---|---|
| 5,640,767 A | 6/1997 | Jackson et al. | |
| 5,660,044 A | 8/1997 | Bonciani et al. | |
| 6,019,579 A | 2/2000 | Fukuno et al. | |
| 6,213,714 B1 | 4/2001 | Rhodes | |
| 6,214,248 B1* | 4/2001 | Browning et al. | 216/56 |
| 6,247,896 B1 | 6/2001 | Auxier et al. | |
| 6,280,140 B1 | 8/2001 | Soechting et al. | |
| 6,321,449 B2* | 11/2001 | Zhao et al. | 29/890.01 |
| 6,329,632 B1* | 12/2001 | Fournier et al. | 219/121.7 |
| 6,339,879 B1* | 1/2002 | Wheat et al. | 29/889.721 |
| 6,374,158 B1* | 4/2002 | Fusaro, Jr. | 700/254 |
| 6,380,512 B1* | 4/2002 | Emer | 219/121.71 |
| 6,427,327 B1* | 8/2002 | Bunker | 29/889.1 |
| 6,427,446 B1 | 8/2002 | Kraft et al. | |
| 6,443,700 B1 | 9/2002 | Grylls et al. | |
| 6,461,107 B1 | 10/2002 | Lee et al. | |
| 6,461,108 B1 | 10/2002 | Lee et al. | |
| 6,488,238 B1 | 12/2002 | Battisti | |
| 6,499,949 B2 | 12/2002 | Schafrik et al. | |
| 6,528,118 B2 | 3/2003 | Lee et al. | |
| 6,551,061 B2 | 4/2003 | Darolia et al. | |
| 6,568,187 B1 | 5/2003 | Jorgensen et al. | |
| 6,582,194 B1 | 6/2003 | Birkner et al. | |
| 6,617,003 B1 | 9/2003 | Lee et al. | |
| 6,638,639 B1 | 10/2003 | Burke et al. | |
| 6,682,022 B2 | 1/2004 | Battisti | |
| 6,905,302 B2* | 6/2005 | Lee et al. | 415/115 |
| 7,204,019 B2* | 4/2007 | Ducotey et al. | 29/889.1 |
| 7,308,794 B2 | 12/2007 | Morenko et al. | |
| 7,329,832 B2* | 2/2008 | Hoebel et al. | 219/121.71 |
| 7,402,335 B2 | 7/2008 | Bolms et al. | |
| 7,611,324 B2 | 11/2009 | Lee et al. | |
| 2002/0141869 A1* | 10/2002 | Lee et al. | 416/97 R |
| 2002/0141870 A1 | 10/2002 | Schafrik et al. | |
| 2002/0141872 A1 | 10/2002 | Darolia et al. | |
| 2003/0145604 A1 | 8/2003 | Pidcock et al. | |
| 2005/0111963 A1 | 5/2005 | Tiemann | |
| 2005/0135920 A1 | 6/2005 | Synnott et al. | |
| 2006/0032229 A1 | 2/2006 | Anderson et al. | |
| 2006/0210399 A1 | 9/2006 | Kitamura et al. | |
| 2007/0169484 A1 | 7/2007 | Schumacher et al. | |
| 2007/0227150 A1 | 10/2007 | Alkabie et al. | |
| 2008/0179837 A1 | 7/2008 | Ryan | |
| 2009/0196737 A1 | 8/2009 | Mitchell | |
| 2009/0199568 A1 | 8/2009 | Schumacher et al. | |
| 2010/0050650 A1 | 3/2010 | Patel et al. | |
| 2010/0080688 A1* | 4/2010 | Bezencon et al. | 415/115 |

FOREIGN PATENT DOCUMENTS

| | | |
|---|---|---|
| JP | 3210029 | 9/1991 |
| WO | WO9219851 | 1/1993 |
| WO | WO9404250 | 3/1994 |
| WO | WO9837312 | 8/1998 |
| WO | WO9849496 | 11/1998 |
| WO | WO9906771 | 2/1999 |
| WO | WO0140713 | 6/2001 |

OTHER PUBLICATIONS

U.S. Appl. No. 12/765,372, filed Apr. 22, 2010, Benjamin Lacy.

* cited by examiner

TURBINE COMPONENTS WITH COOLING FEATURES AND METHODS OF MANUFACTURING THE SAME

BACKGROUND OF THE INVENTION

The subject matter disclosed herein relates generally to turbine systems, such as gas turbine systems, and more particularly to approaches for cooling a hot gas path component in such a turbine system.

Turbine systems are widely utilized in fields such as power generation. A conventional gas turbine system utilized for power generation includes a compressor, a combustor, and a turbine. Typically such a gas turbine system produces high temperature flows of gas through a flow path defined by the components of the turbine. Higher temperature flows generally are desired as such higher temperatures may be associated with increased performance, efficiency, and power output of the gas turbine system. That is, the high temperature flows are typically associated with or indicative of the types of combustion and flow conditions one looks for in a properly functioning gas turbine system.

However, as might be expected, such high temperatures can cause excessive heating of the components within the flow path. Such heating may in turn cause one or more of these components to fail. Thus, because of the desirability of these high temperature flow conditions in a properly running system, the components that are subjected to high temperature flows must be cooled to allow the gas turbine system to operate with flows at increased temperatures.

Various strategies may be employed for cooling components that are subjected to high temperature flows. These components are typically known as hot gas path components. However, many of the cooling strategies employed result in comparatively low heat transfer rates and non-uniform component temperature profiles, which may be insufficient to achieve the desired cooling.

In all of these exemplary gas turbine engine components, thin metal walls of high strength superalloy metals are typically used for enhanced durability while minimizing the need for cooling thereof. Various cooling circuits and features are tailored for these individual components in their corresponding environments in the engine. For example, a series of internal cooling passages, or serpentines, may be formed in a hot gas path component. A cooling fluid may be provided to the serpentines from a plenum, and the cooling fluid may flow through the passages, cooling the hot gas path component substrate and coatings. However, this cooling strategy typically results in comparatively low heat transfer rates and non-uniform component temperature profiles.

Micro-channel cooling has the potential to significantly reduce cooling requirements by placing the cooling as close as possible to the heat zone, thus reducing the temperature delta between the hot side and cold side for a give heat transfer rate. However, when applying the structural coating over micro-channels, the most critical regions are the top edges of the channels. If these edges are not sharp and at right angles, then flaws can be initiated at the interface between the substrate base metal and the structural coating, either as a gap, a crack starter, or as a small void that can propagate flaws into the coating as it is deposited.

It would therefore be desirable to provide a method for forming micro-channels in a component with channel edges formed as sharp right angles, without further processing of the substrate base metal.

BRIEF DESCRIPTION OF THE INVENTION

In one embodiment, a method for manufacturing a turbine component is provided. In accordance with this method, one or more channels are formed in an external surface of the turbine component. One or more holes are formed between the one or more channels and an interior region of the turbine component. A metal or metal alloy wire or powder is mechanically pressed into the one or more channels so as to substantially fill the one or more channels. One or more coatings are applied to the external surface of the turbine component over the one or more channels filled with the metal or metal alloy wire or powder. One or more holes are formed through the coatings and the metal or metal alloy wire or powder is removed from the channels.

In another embodiment, a method for forming a hot gas path component is provided. In accordance with this method, one or more channels are formed in an external surface of the hot gas path component. The one or more channels are connected to one or more internal passages within the hot gas path component such that channels and the internal passages are in fluid communication. A solid metal or metal alloy material is mechanically pressed into the one or more channels such that the one or more channels are substantially filled with the solid metal or metal alloy material. At least a first layer is applied to the external surface of the hot gas path component such that the one or more channels are covered. One or more cooling holes are formed through at least the first layer and the solid metal or metal alloy material is removed from the channels.

In a further embodiment, a manufacture for use in a turbomachine is provided. The manufacture includes a body having one or more interior passages and an external surface of the body in which one or more channels are formed. The one or more channels are in fluid communication with the one or more interior passages. The manufacture also includes a solid metal or metal alloy disposed within the one or more channels so as to fill or substantially fill at least the one or more channels.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Further, each example or embodiment is provided to facilitate explanation of certain aspects of the invention and should not be interpreted as limiting the scope of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present disclosure covers such modifications and variations as come within the scope of the appended claims and their equivalents.

The present disclosure is generally directed to turbine components, particularly hot gas path components, formed with cooling features, such as microchannels, to facilitate cooling of the respective components. In particular, aspects of the present disclosure are directed to methods of forming microchannels in a hot gas path component for use in a turbine. With this in mind, the following discussion provides a general overview of a representative turbine system in which such a cooling system may be employed as well as a discussion of the formation of cooling microchannels in suitable components of such a turbine system.

Figure 1:
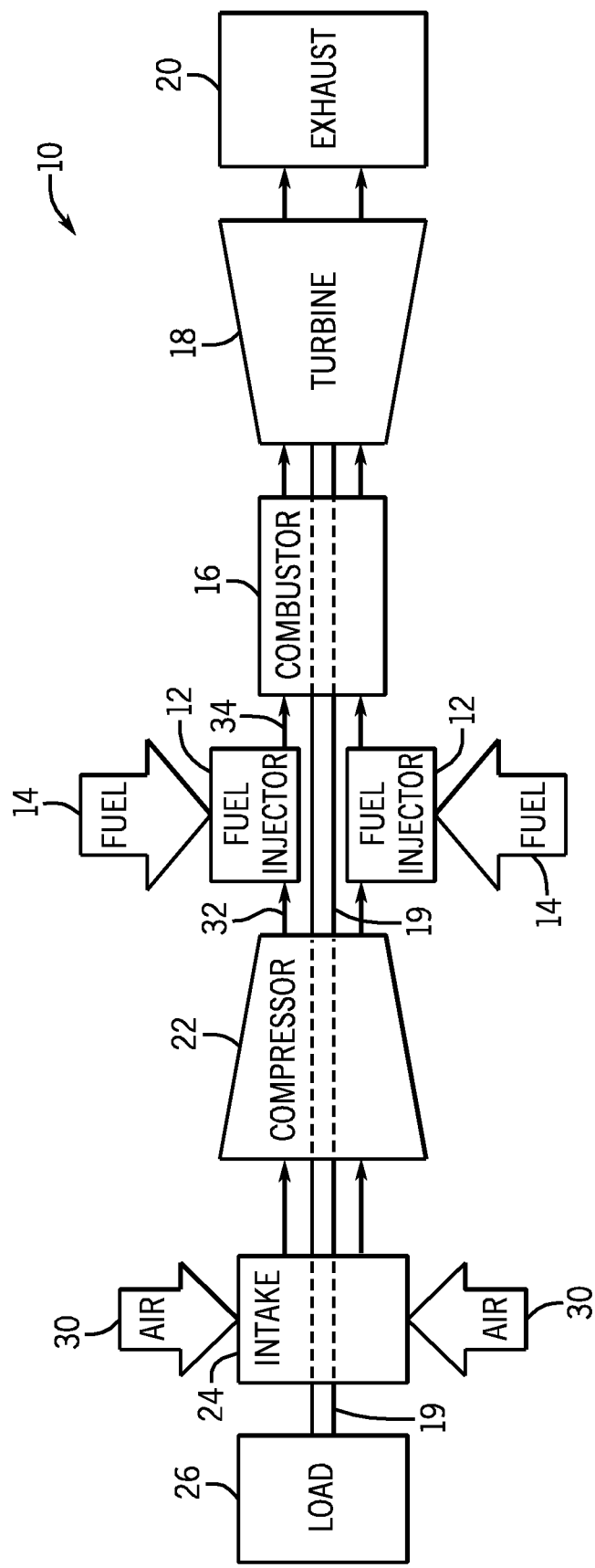
FIG. 1 is a block diagram of a turbine system in accordance with certain aspects of the disclosure.

Turning now to the drawings, FIG. 1 is a block diagram of a turbine system 10. The depicted turbine system 10 includes a fuel injector 12, a fuel supply 14, and a combustor 16. As illustrated, the fuel supply 14 routes a liquid fuel and/or gas fuel, such as natural gas, to the gas turbine system 10 through the fuel injector 12 into the combustor 16. The fuel injector 12 is configured to inject and mix the fuel with compressed air. The combustor 16 ignites and combusts the fuel-air mixture, and then passes hot pressurized exhaust gas into a turbine 18. As will be appreciated, the turbine 18 includes one or more stators having fixed vanes or blades, and one or more rotors having blades which rotate relative to the stators. The exhaust gas passes over the turbine rotor blades, thereby driving the turbine rotor to rotate. Coupling between the turbine rotor and a shaft 19 will cause the rotation of the shaft 19, which is also coupled to several components throughout the gas turbine system 10, as illustrated. Eventually, the exhaust of the combustion process may exit the gas turbine system 10 via an exhaust outlet 20.

A compressor 22 includes blades rigidly mounted to a rotor which is driven to rotate by the shaft 19. As air passes over the rotating blades, air pressure increases, thereby providing the combustor 16 with sufficient air for proper combustion. The compressor 22 may intake air to the gas turbine system 10 via an air intake 24. Further, the shaft 19 may be coupled to a load 26, which may be powered via rotation of the shaft 19. As will be appreciated, the load 26 may be any suitable device that may use the power of the rotational output of the gas turbine system 10, such as a power generation plant or an external mechanical load. For example, the load 26 may include an electrical generator, a propeller of an airplane, and so forth. The air intake 24 draws air 30 into the gas turbine system 10 via a suitable mechanism, such as a cold air intake. The air 30 then flows over blades of the compressor 22, which provides compressed air 32 to the combustor 16. In particular, the fuel injector 12 may inject the compressed air 32 and fuel 14, as a fuel-air mixture 34, into the combustor 16. Alternatively, the compressed air 32 and fuel 14 may be injected directly into the combustor for mixing and combustion.

As will be appreciated from the above discussion, the turbine system 10 may include a variety of components within the path of the hot gases generated by the combustion process, i.e., hot gas path components. As used herein, a hot gas path component is any component of the turbine system 10 that is at least partially exposed to a high temperature flow of gas through the turbine system 10. For example, bucket assemblies (also known as blades or blade assemblies), nozzle assemblies (also known as vanes or vane assemblies), shroud assemblies, transition pieces, retaining rings, and compressor exhaust components are all hot gas path components. However, it should be understood that use of the term the hot gas path component in the present disclosure is not limited to the above examples, but may be any component that is at least partially exposed to a high temperature flow of gas. Further, it should be understood that the hot gas path components of the present disclosure are not limited to components of a gas turbine system, but may be any piece of machinery or component thereof that may be exposed to high temperature flows.

When a hot gas path component is exposed to a hot gas flow, the hot gas path component is heated by the hot gas flow and may reach a temperature at which the hot gas path component fails or is otherwise degraded in performance. Thus, in order to allow turbine system 10 to operate with hot gas flow at a high temperature, thereby increasing the efficiency and performance of the turbine system 10, a cooling system for the hot gas path components may be utilized.

In general, the cooling system of the present disclosure includes a series of small channels, or microchannels, formed in the surface of some or all of the hot gas path components of the turbine system 10. The hot gas path component may also be provided with one or more cover layers, such as structural coatings and/or topcoats. A cooling fluid may be provided to the channels from a plenum, and the cooling fluid may flow through the channels, cooling the cover layers, i.e., the skin, of the component. Such an approach, as discussed herein, may be customized or tailored to provide a higher cooling density (such as per unit surface area or volume) or greater cooling effectiveness than other approaches.

Figure 2:
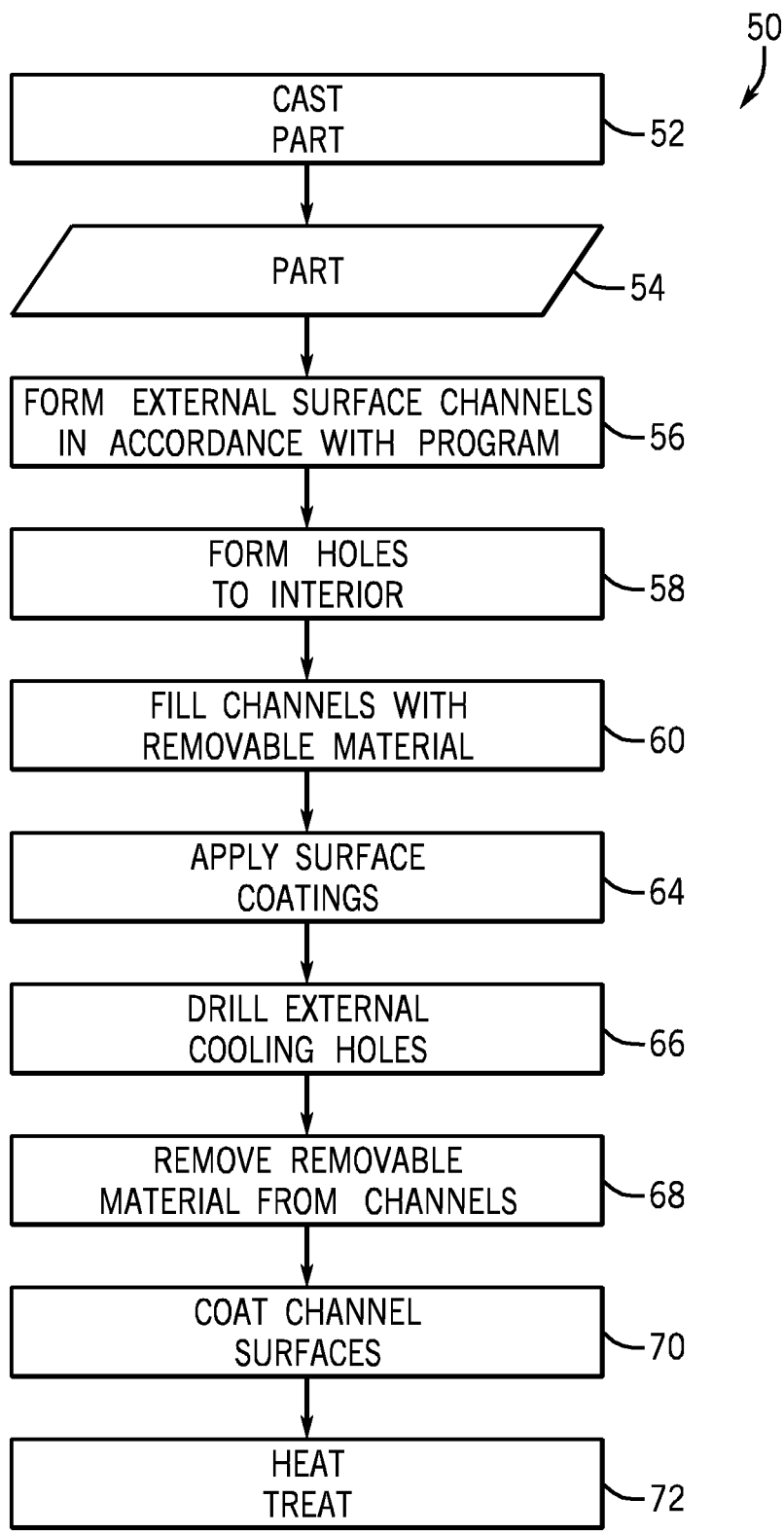
FIG. 2 is a flow chart depicting one implementation of a method for forming a hot gas path components, in accordance with certain aspects of the disclosure.
Figure 3:
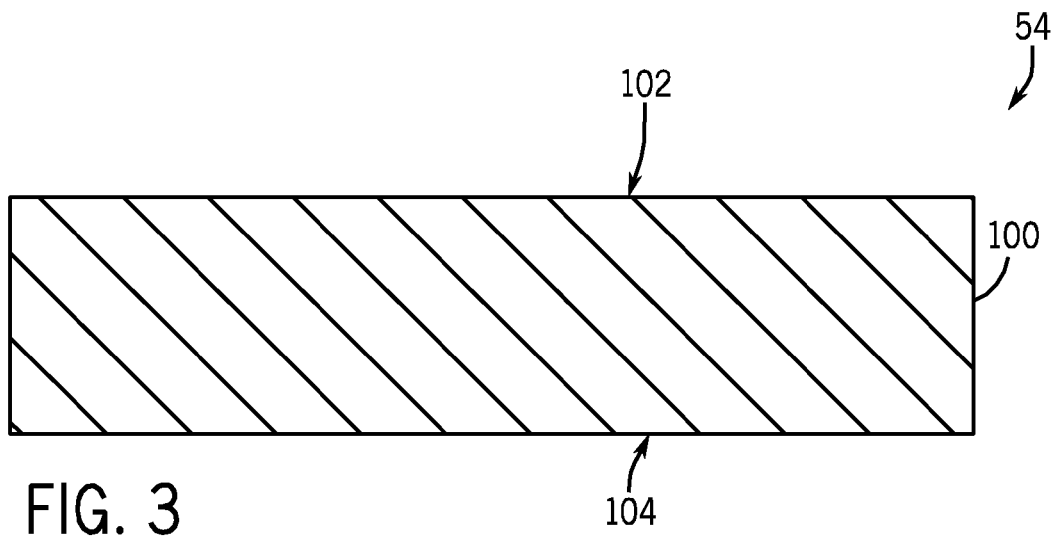
FIG. 3 depicts a sectional view of a portion of a hot gas path component, in accordance with aspects of the disclosure.

With this in mind, FIG. 2 depicts a method 50 for forming components for use in a hot gas path in accordance with the present approach. In this example, a part 54 in which microchannels are to be formed is initially cast (block 52). For example, the part 54 being cast, such as a hollow spar, may be formed without complex internals and with no external channels. Turning to FIG. 3, a portion of a cast part 54 is depicted as having a substrate layer 100 in which one surface 102 is the external or outward facing surface of the part 54 and the opposing surface 104 is an internal or inward facing surface of the part 54.

The substrate 100 is typically cast prior to forming the channels 110 in the external surface 102 of the substrate 110. As discussed in commonly assigned U.S. Pat. No. 5,626,462, which is incorporated by reference herein in its entirety for all purposes, substrate 100 may be formed from any suitable material. Depending on the intended application for part 54, this could include Ni-base, Co-base and Fe-base superalloys. The Ni-base superalloys may be those containing both $\gamma$ and $\gamma'$ phases, such as those Ni-base superalloys containing both $\gamma$ and $\gamma'$ phases wherein the $\gamma'$ phase occupies at least 40% by volume of the superalloy. Such alloys are known to be advantageous because of a combination of desirable properties including high temperature strength and high temperature creep resistance. The substrate material may also comprise a NiAl intermetallic alloy, as these alloys are also known to possess a combination of superior properties including high temperature strength and high temperature creep resistance that are advantageous for use in turbine engine applications used for aircraft. In the case of Nb-base alloys, coated Nb-base alloys having superior oxidation resistance may be used, such as Nb/Ti alloys, and including those alloys comprising Nb-(27-40)Ti-(4.5-10.5)Al-(4.5-7.9)Cr-(1.5-5.5) Hf-(0-6)V in an atom percent. The substrate material may also comprise a Nb-base alloy that contains at least one secondary phase, such as an Nb-containing intermetallic compound, a Nb-containing carbide or a Nb-containing boride. Such alloys are analogous to a composite material in that they contain a ductile phase (i.e. the Nb-base alloy) and a strengthening phase (i.e. a Nb-containing intermetallic compound, a Nb containing carbide or a Nb-containing boride). It should be understood that the component substrate 100 of the present disclosure is not limited to the above materials, but may be any material used in any hot gas path component.

Figure 4:
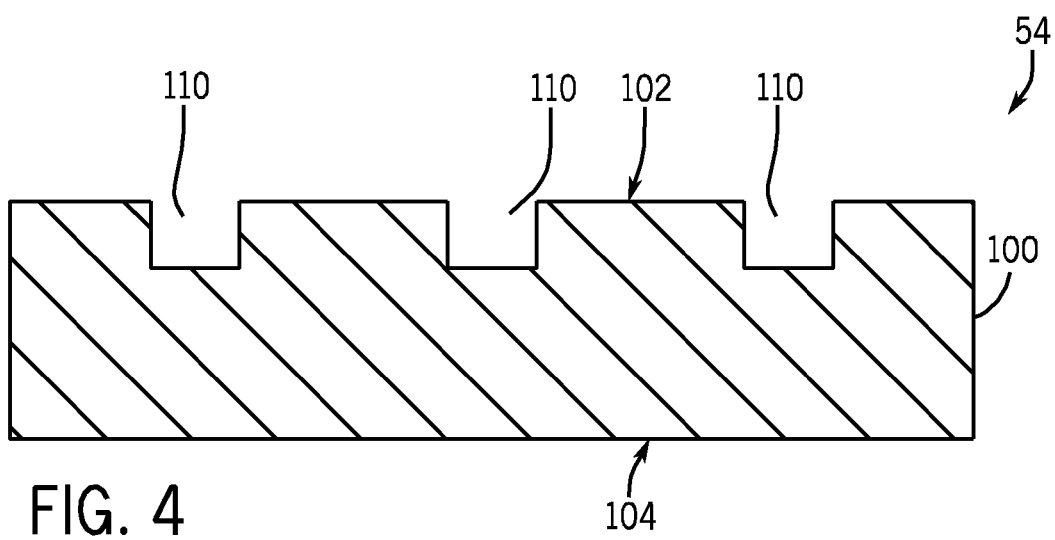
FIG. 4 depicts a sectional view of the portion of the hot gas path component of FIG. 3 after formation of channels within a surface of the component, in accordance with aspects of the disclosure.

Turning to FIGS. 2 and 4, channels 110 (e.g., microchannels) are formed (block 56) in the external surface 102 of the part 54. In accordance with certain embodiments, the channels 110 are designed or configured to allow a cooling fluid to flow through the channels 110. The flow of the cooling fluid may thereby cool adjacent or proximate regions of the part 54 through convective cooling, such as by transferring heat from the substrate 100 or one or more layers disposed on the external surface 102 of the substrate 100 (discussed in greater detail below) to the cooling medium.

The channels 110 may be formed or machined under the guidance or control of a programmed or otherwise automated process (such as a robotically controlled process) to achieve the desired size, placement, and/or configuration of channels 110 within the external surface 102. For example, the channels 110 may be formed in the external surface 102 through use of, for example, laser machining (e.g., laser drilling), abrasive liquid jet (e.g., abrasive micro water jet (A$\mu$WJ)), electro-chemical machining (ECM), plunge electrochemical machining (plunge ECM), electrodischarge machining (EDM), electric discharge machining with a spinning electrode (milling EDM), or any other process capable of providing channels with proper sizes and tolerances.

In certain embodiments the channels 110 may have depths in a range from approximately 0.2 mm to approximately 2 mm, such as from approximately 0.5 mm to approximately 1 mm. Further, in certain embodiments the channels 110 may have widths in a range from approximately 0.2 mm to approximately 2 mm, such as from approximately 0.5 mm to approximately 1 mm. Further, the widths and/or depths may be substantially constant for a channel 110 or may vary (such as increasing, decreasing, tapering, and so forth) over the course of the channel 110.

For example, in one implementation the width and/or depth of a channel 110 may decrease along the length of the channel 110 in the direction of flow of the cooling medium through the channel 110. Alternatively, the width and/or depth of a channel 110 may increase along the length of the channel 110 in the direction of flow of the cooling medium through the channel 110. Further, the width and/or depth of each channel 110 may vary independently from other channels 110, i.e., some channels 110 may increase in width and/or depth in the direction of the flow of the cooling medium while others may decrease and/or the extent of increase or decrease may vary from channel to channel. As will be appreciated, in other embodiments, some or all of the channels 110 may have substantially constant widths and/or depths.

In addition, the channels 110 may have cross-sections of any suitable geometric shape, such as, for example, a square, a rectangle, an oval, a triangle, or any other geometric shape that will facilitate the flow of a cooling medium through the channel 110. It should be understood that various channels 110 may have cross-sections with a certain geometric shape, while other channels 110 may have cross-sections with another geometric shape. In addition, in certain embodiments the surface (i.e., the sidewalls and/or floor) of a channel 110 may be a substantially smooth surface, though in other embodiments all or portions of the channel surface may include protrusions, recesses, surface texture, or other features such that the surface of the channel is not smooth. For example, surface features that may be present on the surface of a channel 110 may include, but are not limited to, fin-shaped protrusions, cylindrical-shaped protrusions, or turbulators, or any combination thereof, as well as any other suitable geometric shape. It should be understood that the dimensions of any surface features that are present may be selected to optimize cooling provided by the respective channel 110.

Further, the channels 110 may be generally straight channels, or may be generally curved, or serpentine channels. For example, all or part of the channels 110 may be provided as complex curves or as part of a three-dimensional configuration with respect to the external surface 102 of the substrate 100. Indeed, the configuration of the channels 110 may be specific to the part 54 being manufactured such that certain portions of the part 54 contain a higher density of cooling channels 110 than others. That is, the configuration of channels may be tailored to account for the expected heat profile of the part 54 when in use. Thus, tips, platforms, and trailing edges of blades may be fabricated with a greater density of cooling channels 110 than other portions of a blade or other component that are generally subjected to less heat. This may allow coolant to be employed only where it is needed and/or may allow cooling flow to be reduced compared to other cooling approaches. As will be appreciated, the channels 110 may be oriented such that the cooling medium flows through the channels 110 in any direction with respect to the hot gas flow. For example, the cooling medium may flow through some or all of the channels 110 in a generally upstream, downstream, and/or orthogonal direction with respect to the hot gas flow, or in any other suitable direction with respect to the hot gas flow.

In some embodiments, each of the channels 110 may be singular, discrete channels. In other embodiments, however, each of the channels 110, or any portion of the channels 110, may branch off from single channels 110 to form multiple channel branches 110. It should further be understood that the channels 110 may, in some embodiments, wrap around the entire perimeter of a hot gas path component (i.e., part 54), or may wrap around only portions of the perimeter of a hot gas path component. However, it should further be understood that each of the channels 110 may generally not intersect with any other channel 110.

Figure 5:
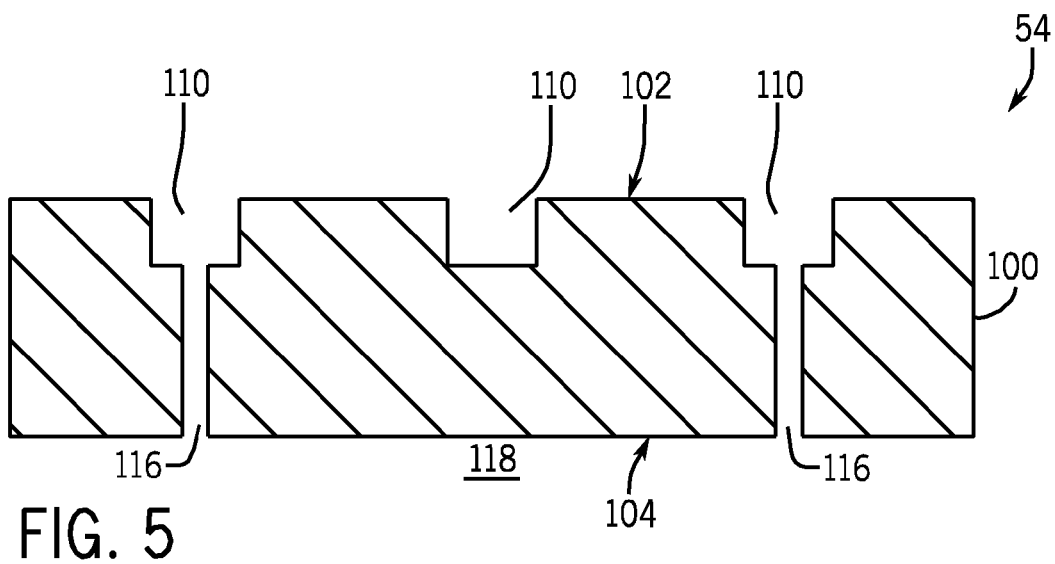
FIG. 5 depicts a sectional view of the portion of the hot gas path component of FIG. 4 after formation of holes connecting the channels to an interior region of the component, in accordance with aspects of the disclosure.

Turning to FIGS. 2 and 5, at block 58 one or more holes 116 may be popped or drilled to connect some or all of the channels 110 to an interior region 118 defined by the part 54, such as a spar interior space. As depicted, the holes 116 may extend generally through the substrate layer 100 and may fluidly connect the channels 110 to the interior space 118 as well as fluidly connecting some or all of the channels 110 to one another via the interior space 118. For example, each channel 110 may be fluidly connected to at least one of the holes 116. Once manufacture of the part 54 is complete and the channels 110 are covered by a structural coating layer and/or other layers (as discussed below), the holes 116 may allow the flow of the cooling medium provided via the interior space 118 to the channels 110. For example, once a structural coating layer is in place over the respective channels 110, at least one cooling circuit may be defined within or provided on the surface of the part 54 by the respective fluidic connection of the interior space 118 to one or more channels 110 via respective holes 116. Cooling medium may flow through a cooling circuit defined by these features at a pressure generally higher than the pressure in the holes 116 and channels 110. This pressure differential may cause a portion of the cooling medium contained within the cooling circuit to flow into and through the holes 116, and from the holes 116 into and through the channels 110. From there, the cooling medium may exit the channels 110, as discussed in greater detail below, via one or more exit holes (e.g., cooling holes 140), thereby completing the flow circuit from the interior of the part 54 to the exterior.

Further, some or all of the holes 116 may be configured to provide impingement cooling to a structural coating 130 and/or topcoat 134 provided over the respective channels 100, as described below. For example, the holes 116 may be oriented generally perpendicularly within the substrate 100 with respect to the external surface 102 and/or the structural coating 130 and/or topcoat 134. Thus, as cooling medium flows through the holes 116 and is provided to the channels 110, the cooling medium may exit the holes 116 and impinge on the structural coating 130 and/or topcoat 134, thereby providing impingement cooling of one or both of these layers. After the cooling medium flows through the channels 110, the cooling medium may be exhausted directly from the channels 110 (such as at a tip or edge of the part 54) and/or through exhaust passages (e.g., cooling holes 140) through any layers covering the channels 110. It should be understood that each channel 110 may be connected to one or more of the exhaust passages. It should further be understood that the exhaust passages may be oriented at any angle with respect to the channels 110.

Figure 6:
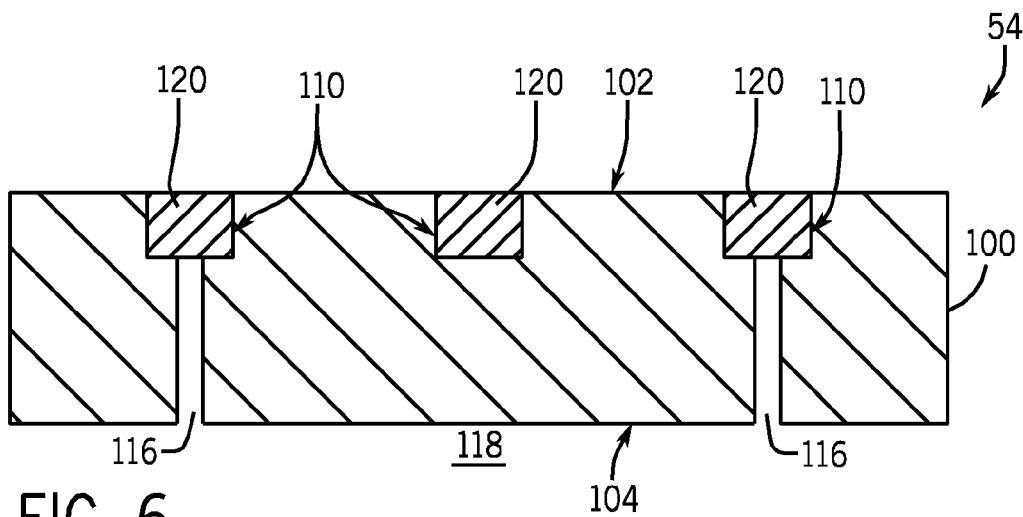
FIG. 6 depicts a sectional view of the portion of the hot gas path component of FIG. 4 with the channels filled with a solid filler material, in accordance with aspects of the disclosure.

Turning to FIGS. 2 and 6, each channel 110 may be filled (block 60) with one or more solid filler materials 120 that can be chemically removed during a subsequent step, such as by leaching, dissolving, melting, oxidizing, etching, and so forth. For example, in the case of molybdenum and tungsten solid filler materials, these materials have high vapor pressure oxides that sublimate when heated above 700° C. In certain embodiments, the filler material 120 is a solid wire filler formed from an elemental or alloy metallic material. In one embodiment, the filler material is a deformable material, such as an annealed metal wire, which when mechanically pressed into the channel 110, is deformed to conform to the shape of the channel 110. It should be appreciated that the term "wire" as used herein denotes a solid continuous piece of material that conforms to, or can be mechanically deformed to conform to, the cross-sectional shape of the respective channels 110. Thus, a wire, as used herein, need not have a circular cross-section but may instead have a square or rectangular cross-section, or any other geometric cross-section that will facilitate fitting into and filling the respective channels 110. In other embodiments, the metal or metal alloy material may be provided as a powder that is pressed into the channel 110 and conforms to the channel 110 so as to substantially fill the channel 110, as with the wire embodiments discussed above. In one such embodiment the metal or metal alloy powder is provided without a binder or carrier. In one implementation the metal or metal alloy wire or powder is mechanically pressed into the channels 110 and substantially or completely fills the channels 110. Any portion of the solid metal filler that protrudes out of the channel 110 (i.e., overfill) may be polished or machined off prior to application of coatings, as discussed below, such that the exposed surface of the part 54 and the filler material 120 form a contiguous and smooth surface upon which subsequent layers and coatings may be applied. Suitable materials that may be used to form the solid metal filler may include, but are not limited to, copper, aluminum, molybdenum, tungsten, nickel, monel, nichrome, and so forth.

After application of the filler material 120 to the channels 110, the external surface 102 of the substrate 100 may be cleaned and prepared for coating, such as by machining, grit blasting, washing and/or polishing the external surface 102, including the portions of the filler material 120 that form or extend past the external surface 102.

Figure 7:
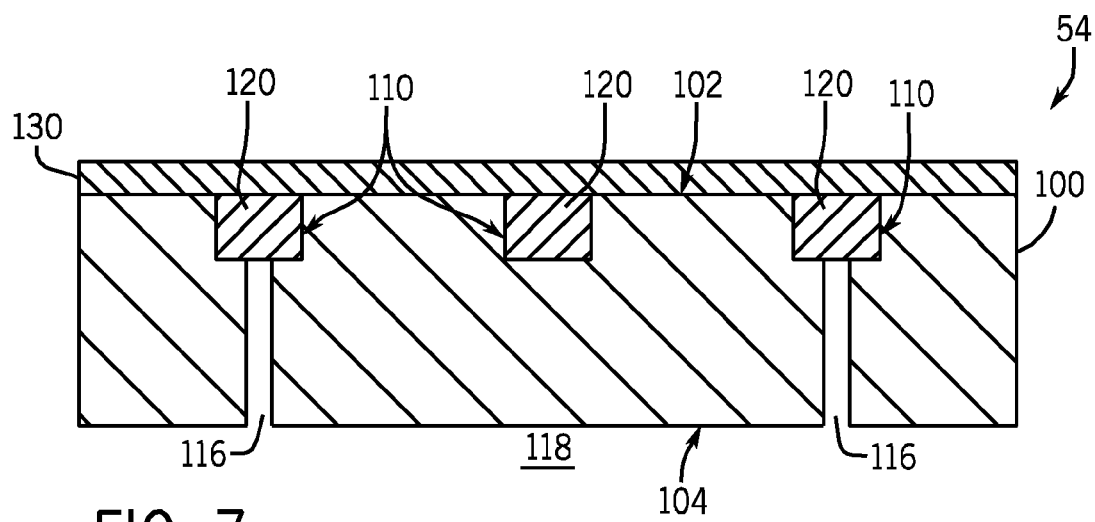
FIG. 7 depicts a sectional view of the portion of the hot gas path component of FIG. 6 after application of a structural layer coating on an external surface of the component, in accordance with aspects of the disclosure.
Figure 8:
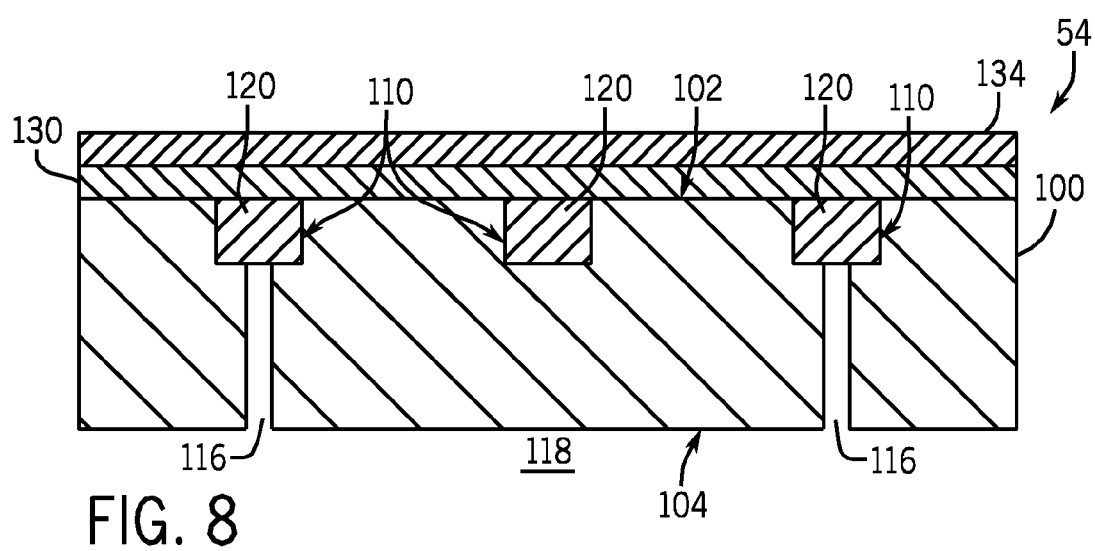
FIG. 8 depicts a sectional view of the portion of the hot gas path component of FIG. 7 after application of a topcoat layer, in accordance with aspects of the disclosure.

Once the external surface 102 of the substrate 100 is suitably cleaned and prepared, one or more surface coatings may be applied (FIG. 2, block 64) to the external surface 102 over the filler material 120, as depicted in FIGS. 7 and 8. Structural coating 130 may be any suitable material and is bonded to the external surface 102 of substrate 100. For particular configurations, the structural coating 130 has a thickness in the range of 0.1-2.0 millimeters, such as in the range of 0.1 to 1 millimeters or in the range of 0.1 to 0.5 millimeters for industrial components. For aviation components, this range is typically 0.1 to 0.25 millimeters. However, other thicknesses may be utilized depending on the requirements for a particular part 54.

The structural coating 130 may be deposited using a variety of techniques. For particular processes, the structural coating 130 is disposed over at least a portion of the external surface 102 of the substrate 100 by performing an ion plasma deposition. Example cathodic arc ion plasma deposition apparatus and method are provided in commonly assigned, US Published Patent Application No. 20080138529, Weaver et al, "Method and apparatus for cathodic arc ion plasma deposition," which is incorporated by reference herein in its entirety for all purposes. Briefly, ion plasma deposition comprises placing a cathode formed of a coating material into a vacuum environment within a vacuum chamber, providing a substrate 100 within the vacuum environment, supplying a current to the cathode to form a cathodic arc upon a cathode surface resulting in erosion or evaporation of coating material from the cathode surface, and depositing the coating material from the cathode upon the substrate surface 102.

In one non-limiting example, the ion plasma deposition process comprises a plasma vapor deposition process. Non-limiting examples of the structural coating 130 include metal coatings, bond coatings and thermal barrier coatings, as discussed in greater detail below with reference to U.S. Pat. No. 5,626,462. For certain hot gas path components 54, the structural coating 130 comprises a superalloy. For example, where the substrate 100 is formed using a Ni-base superalloy containing both γ and γ' phases, structural coating 130 may comprise these same materials, as discussed in greater detail below with reference to U.S. Pat. No. 5,626,462.

For other process configurations, the structural coating 130 is disposed over at least a portion of the external surface 102 of the substrate 100 by performing a thermal spray process. For example, the thermal spray process may comprise high velocity oxygen fuel spraying (HVOF) or high velocity air fuel spraying (HVAF). In one non-limiting example, a NiCrAlY coating is deposited by HVOF or HVAF. For other example process configurations, a low pressure plasma spray (LPPS) process may be employed.

More generally, and as discussed in U.S. Pat. No. 5,626,462, the material used to form structural coating 130 may be any suitable material. For the case of a cooled turbine component, the material forming the structural coating 130 should be capable of withstanding temperatures of about 1150° C., while the thermal barrier coating (TBC) can go to about 1320° C. The structural coating 130 is typically compatible with and adapted to be bonded to the external surface 102 of substrate 100. This bond may be formed when the structural coating 130 is deposited onto substrate 100. This bonding may be influenced during the deposition by many parameters, including the method of deposition, the temperature of the substrate 100 during the deposition, whether the deposition surface is biased relative to the deposition source, and other parameters. Bonding may also be affected by subsequent heat treatment or other processing. In addition, the surface morphology, chemistry and cleanliness of substrate 100 prior to the deposition can influence the degree to which metallurgical bonding occurs. In addition to forming a strong metallurgical bond between structural coating 130 and substrate 100, it is desirable that this bond remain stable over time and at high temperatures with respect to phase changes and interdiffusion, as described herein. By compatible, it is preferred that the bond between these elements be thermodynamically stable such that the strength and ductility of the bond do not deteriorate significantly over time (e.g. up to 3 years) by interdiffusion or other processes, even for exposures at high temperatures on the order of 1,150° C., for Ni-base alloy airfoil support walls and Ni-base airfoil skins, or higher temperatures on the order of 1,300° C. in the case where higher temperature materials are utilized, such as Nb-base alloys.

As discussed in U.S. Pat. No. 5,626,462, where the material forming substrate 100 is an Ni-base superalloy containing both γ and γ' phases or a NiAl Intermetallic alloy, materials used to form the structural coating 130 may include these same materials. Such a combination of structural coating 130 and substrate 100 materials is suitable for applications such as where the maximum temperatures of the operating environment is similar to those of existing engines (e.g. below 1650° C.). In the case where the material used to form the substrate 100 is an Nb-base alloys, materials used to form structural coating 130 may also include an Nb-base alloy, including the same Nb-base alloy.

As discussed in U.S. Pat. No. 5,626,462, for other applications, such as applications that impose temperature, environmental or other constraints that make the use of a metal alloy structural coating 130 undesirable, the structural coating 130 may be formed using materials that have properties that are superior to those of metal alloys alone, such as composites in the general form of intermetallic compound ($I_s$)/metal alloy (M) phase composites and intermetallic compound ($I_s$)/intermetallic compound ($I_M$) phase composites. Metal alloy M may be the same alloy as used for an airfoil support wall in certain embodiments, or a different material, depending on the requirements of the part 54. These composites are generally speaking similar, in that they combine a relatively more ductile phase M or $I_M$ with a relatively less ductile phase $I_s$, in order to create a structural coating 130 that gains the advantage of both materials. Further, in order to have a successful composite, the two materials should be compatible. As used herein in regard to composites, the term compatible means that the materials are capable of forming the desired initial distribution of their phases, and of maintaining that distribution for extended periods of time as described above at use temperatures of 1,150° C. or more, without undergoing metallurgical reactions that substantially impair the strength, ductility, toughness, and other important properties of the composite. Such compatibility can also be expressed in terms of phase stability. That is, the separate phases of the composite have a stability during operation at temperature over extended periods of time so that these phases remain separate and distinct, retaining their separate identities and properties and do not become a single phase or a plurality of different phases due to interdiffusion. Compatibility can also be expressed in terms of morphological stability of the interphase boundary interface between the $I_S/M$ or $I_S/I_M$ composite layers. Such instability may be manifested by convolutions, which disrupt the continuity of either layer. It is also noted that within a given structural coating 130, a plurality of $I_S/M$ or $I_S/I_M$ composites may also be used, and such composites are not limited to two material or two phase combinations. The use of such combinations are merely illustrative, and not exhaustive or limiting of the potential combinations. Thus $M/I_M/I_S$, $M/I_{S1}/I_{S2}$ (where $I_{S1}$ and $I_{S2}$ are different materials) and many other combinations are possible.

As discussed in U.S. Pat. No. 5,626,462, where substrate 100 comprises a Ni-base superalloy comprising a mixture of both γ and γ' phases, $I_S$ may comprise $Ni_3$ [Ti, Ta, Nb, V], NiAl, $Cr_3Si$, $[Cr, Mo]_XSi$, [Ta, Ti, Nb, Hf, Zr, V]C, $Cr_3C_2$ and $Cr_7C_3$ intermetallic compounds and intermediate phases and M may comprise a Ni-base superalloy comprising a mixture of both γ and γ' phases. In Ni-base superalloys comprising a mixture of both γ and γ' phases, the elements Co, Cr, Al, C and B are nearly always present as alloying constituents, as well as varying combinations of Ti, Ta, Nb, V, W, Mo, Re, Hf and Zr. Thus, the constituents of the exemplary $I_S$ materials described correspond to one or more materials typically found in Ni-base superalloys as may be used to form the substrate 100, and thus may be adapted to achieve the phase and interdiffusional stability described herein. As an additional example in the case where the substrate 100 comprises NiAl intermetallic alloy, $I_S$ may comprise $Ni_3$[Ti, Ta, Nb, V], NiAl, $Cr_3Si$, $[Cr, Mo]_XSi$, [Ta, Ti, Nb, Hf, Zr, V]C, $Cr_3C_2$ and $Cr_7C_3$ intermetallic compounds and intermediate phases and $I_M$ may comprise a $Ni_3Al$ intermetallic alloy. Again, in NiAl intermetallic alloys, one or more of the elements Co, Cr, C and B are typically present as alloying constituents, as well as varying combinations of Ti, Ta, Nb, V, W, Mo, Re, Hf and Zr. Thus, the constituents of the exemplary $I_S$ materials described correspond to one or more materials typically found in NiAl alloys as may be used to form the substrate 100, and thus may be adapted to achieve the phase and interdiffusional stability described herein.

As discussed in U.S. Pat. No. 5,626,462, where substrate 100 comprises a Nb-base alloy, including a Nb-base alloy containing at least one secondary phase, $I_S$ may comprise a Nb-containing intermetallic compound, a Nb-containing carbide or a Nb-containing boride, and M may comprise a Nb-base alloy. Such an $I_S$/M composite may comprise an M phase of an Nb-base alloy containing Ti such that the atomic ratio of the Ti to Nb (Ti/Nb) of the alloy is in the range of 0.2-1, and an $I_S$ phase comprising a group consisting of Nb-base silicides, $Cr_2$[Nb, Ti, Hf], and Nb-base aluminides, and wherein Nb, among Nb, Ti and Hf, is the primary constituent of $Cr_2$[Nb, Ti, Hf] on an atomic basis. These compounds all have Nb as a common constituent, and thus may be adapted to achieve the phase and interdiffusional stability described in U.S. Pat. No. 5,626,462.

In certain embodiments, such as the depicted embodiment of FIG. 8, a topcoat 134, such as a ceramic coating or a thermal barrier coating (TBC) may be applied over the structural coating 130. For example, the topcoat 134 may be yttria-stabilized zirconia, and may be applied to structural coating 130 through a physical vapor deposition process or thermal spray process. Alternatively, the topcoat 134 may be a ceramic, such as, for example, a thin layer of zirconia modified by other refractory oxides such as oxides formed from Group IV, V and VI elements or oxides modified by Lanthanide series elements such as La, Nd, Gd, Yb and the like. Thus, the topcoat 134, when present may provide certain thermal benefits to the part 54 and/or may provide certain finish or texture benefits.

Figure 9:
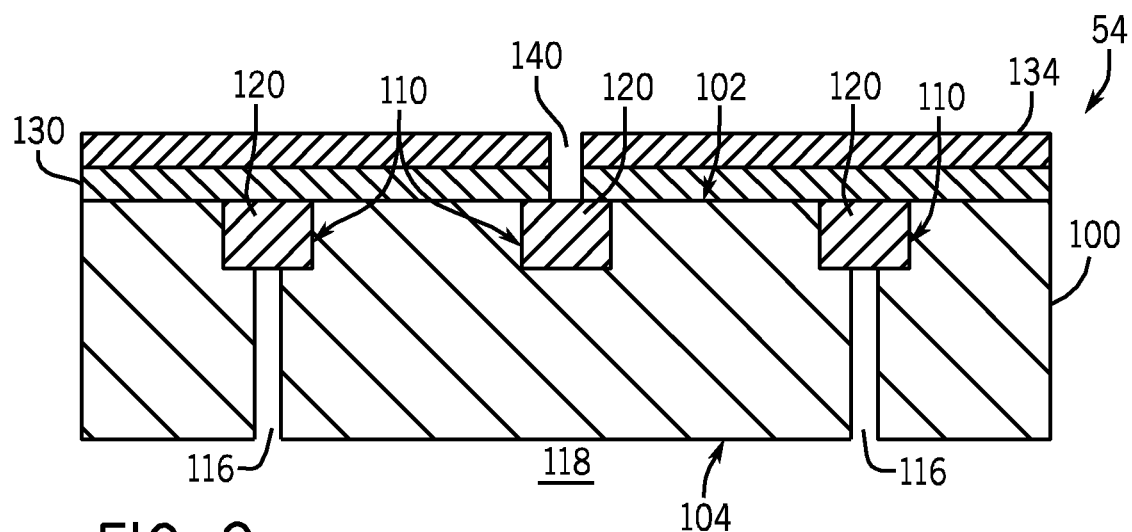
FIG. 9 depicts a sectional view of the portion of the hot gas path component of FIG. 8 after formation of cooling holes through the structural layer coating and topcoat, in accordance with aspects of the disclosure.

Turning to FIGS. 2 and 9, in certain implementations, once any and all structural coatings 130 and/or topcoats 134 are applied, one or more cooling holes 140 are drilled (block 66) or punched through the structural coatings 130 and/or top coats 134 to reach one or more of the filled channels 110. The cooling holes 140 may act as exhaust ports or holes when the part 54 is in use, allowing cooling fluid circulating through the channels 110 to exit the channels 110 and the part 54 to be dispersed in the flow of heated gas or onto the part surface for use as film cooling. As will be appreciated, the cooling holes 140 may have any cross section (e.g., circular, square, rectangular, triangular, oval, and so forth) or size and orientation that is suitable for a cooling fluid to vacate the channels 110.

Figure 10:
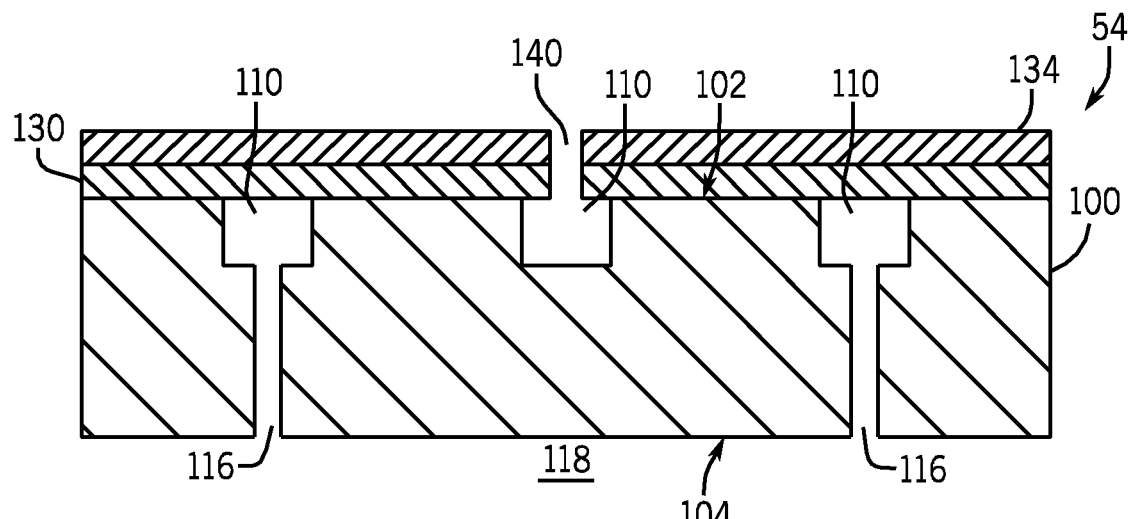
FIG. 10 depicts a sectional view of the portion of the hot gas path component of FIG. 9 after removal of the filler material from the channels, in accordance with aspects of the disclosure.

In the depicted implementation, the filler material 120 is chemically removed (FIG. 2, block 68) from the channels 110, such as by leaching, dissolving, melting, oxidizing, etching, or so forth. For example, in one embodiment, the filler material 120 may be leached or dissolved out of the channels 110 using a suitable solution or compound. In one embodiment in which the filler material 120 is a solid metal filler, such as a solid copper metal wire, the solid metal filler is removed using a concentrated nitric acid (e.g., 67%, 50%, 40% and so forth) flush. In other embodiments, concentrated caustic soda may be used to dissolve the solid metal filler. The remnants of the filler material may exit the part 54 via the cooling holes 140 and/or the interior space 118, both of which are in fluid communication with the channels 110. Once the filler material 120 is removed, the channels 110 are clear and are defined by the floor and sidewalls of the channel along with the interior surface of the structural coating 130, if present, as depicted in FIG. 10.

Turning to FIG. 2, in the depicted embodiment, a coating may be applied (block 70) to the interior surfaces of the channels 110 to protect the channels 110 when in use, such as from heat and/or from the effects of the cooling fluid passing through the channels 110. In one such embodiment, an oxidation-resistant coating may be applied to the interior surfaces of the channels 110 to protect the channel surfaces and/or to the external surface 102 of the substrate 100. For example, in one implementation, the interior surface of the channels 110 can be coated or modified to improve its oxidation and/or hot corrosion resistance. Suitable techniques for applying an oxidation-resistant coating to the interior surface of the channels 110 include vapor-phase or slurry chromiding, vapor-phase aluminizing, pack aluminizing, chemical vapor deposition aluminizing, or slurry aluminizing, or overlay deposition via evaporation, sputtering, ion plasma deposition, thermal spray, and/or cold spray. Example oxidation-resistant overlay coatings include materials in the MCrAlY family (M={Ni,Co,Fe}) as well as materials selected from the NiAlX family (X={Cr,Hf,Zr,Y,La,Si,Pt,Pd}). In one such embodiment, the oxidation-resistant coating may also function as a thermal barrier bond coating for suitable surfaces.

Subsequently the part 54 may be heat treated (block 72) to set and/or finish the various layers and coatings applied to the part 54. After heat treatment, the final part may be inspected as part of a quality control process before being used in the assembly of a turbine system 10, as discussed herein.

By utilizing channels 110 and holes 116 situated at or near the surface of a hot gas path component, as described herein, the cooling system of the present disclosure provides cooling of a hot gas path component, such as part 54, at a high heat transfer rate and with a relatively uniform temperature profile. Thus, the cooling system of the present disclosure may increase the life of the hot gas path component and allow the component to be utilized in conjunction with higher temperature hot gas flows, thus increasing the performance and efficiency of the turbine system 10. Further, in accordance with certain embodiments of the present disclosure, reductions in the temperature of the bulk substrate 100 of a constituent part of a turbine 10 may be achieved during operation of the turbine 10. For example, in certain implementations, substrate bulk temperature may be between about 1300° F. to about 1800° F.

This written description uses examples to disclose the invention, including the best mode, and also to enable any person skilled in the art to practice the invention, including making and using any devices or systems and performing any incorporated methods. The representative examples and embodiments provided herein include features that may be combined with one another and with the features of other disclosed embodiments or examples to form additional embodiments that are still within the scope of the present invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for manufacturing a turbine component, comprising:
    forming one or more channels in an external surface of the turbine component;
    forming one or more holes between the one or more channels and an interior region of the turbine component;
    mechanically pressing a single filler material into the one or more channels so as to deform the single filler material to conform to and substantially fill the one or more channels, wherein the single filler material comprises a metal or a metal alloy wire that conforms to a cross-sectional shape of the respective channels;
    applying one or more coatings to the external surface of the turbine component over the one or more channels filled with the metal or metal alloy wire;
    forming one or more holes through the coatings; and
    removing the metal or metal alloy wire from the channels.

2. The method of claim 1 wherein the one or more coatings comprise a nickel or cobalt alloy.

3. The method of claim 1 comprising heat treating the turbine component after removing the metal or metal alloy from the channels.

4. The method of claim 1 wherein applying at least one coating comprises depositing the coating on the external surface of the turbine component using one or more of high velocity oxy-fuel deposition, ion plasma deposition, low pressure plasma spray, high velocity air-fuel deposition, or cold spray.

5. The method of claim 1 wherein the one or more channels are formed using one or more of abrasive liquid jet, milling electrodischarge machining, laser machining, or plunge electro-chemical machining.

6. The method of claim 1 wherein the metal or metal alloy wire comprises one or more of Cu, Mo, Ni, W, Al, monel, or nichrome.

7. The method of claim 1 wherein removing the metal or metal alloy wire comprises leaching, dissolving, etching, oxidizing, or melting, the metal or metal alloy wire.

8. The method of claim 1 comprising applying a topcoat over the coating and forming the one or more holes through the topcoat as well as the coating.

9. The method of claim 8 wherein the topcoat comprises a ceramic material.

10. The method of claim 1 wherein removing the metal or metal alloy wire from the channels comprises flushing with acid to remove the metal or metal alloy wire.

11. The method of claim 1 wherein at least one of forming the one or more channels, forming the one or more holes to the interior region, forming the one or more holes through the coating, or filling the one or more channels are performed in accordance with a programmed process controlling a robotic interface.

12. The method of claim 1 comprising applying an oxidation-resistant coating to one or both of the channel surfaces or the external surface of the turbine component after removal of the metal or metal alloy from the channels.

13. The method of claim 12 wherein the oxidation-resistant coating comprises an aluminide coating applied by one or more of vapor-phase aluminizing, pack aluminizing, or CVD aluminizing.

14. The method of claim 12 wherein the oxidation-resistant coating comprises a material selected from the alloy families (Ni,Co)CrAlY, NiAl, $Ni_3Al$, and Ni—$Ni_3Al$.

15. The method of claim 12 wherein the oxidation-resistant coating acts as a thermal barrier bond coating.

16. A method for forming a hot gas path component, comprising:
    forming one or more channels in an external surface of the hot gas path component;
    connecting the one or more channels to one or more internal passages within the hot gas path component such that channels and the internal passages are in fluid communication;
    mechanically pressing a single filler material into the one or more channels to deform the single filler material to conform to the one or more channels such that the one or more channels are substantially filled with the single filler material, wherein the single filler material comprises a solid metal or a metal alloy material that conforms to a cross-sectional shape of the respective channels;
    applying at least a first layer to the external surface of the hot gas path component such that the one or more channels are covered;
    forming one or more cooling holes through at least the first layer; and removing the solid metal or metal alloy material from the channels.

17. The method of claim 16, wherein the one or more channels are formed using an automated or robotic machining process.

18. The method of claim 16 wherein the one or more channels are formed using one or more of milling electrodischarge machining, plunge electro-chemical machining, laser machining, or abrasive liquid jets.

19. The method of claim 16 wherein the metal or metal alloy material comprises a metal or metal alloy wire that conforms to and substantially fills the one or more channels when mechanically pressed into the channels.

20. The method of claim 16, wherein the metal or metal alloy material comprises one or more of Cu, Al, W, Mo, Ni, monel, or nichrome.

21. The method of claim 16 wherein applying the first layer comprises applying a layer of a substantially nickel or cobalt alloy using one or more of high-velocity oxy-fuel deposition, ion plasma deposition, low pressure plasma spray, high velocity air-fuel deposition, or cold spray.

22. The method of claim 16 wherein removing the solid metal or metal alloy material from the channels comprises flushing with acid to remove the solid metal or metal alloy material.

\* \* \* \* \*